Oct. 29, 1946.  P. M. RAINEY  2,410,104
LIGHT DIRECTING DEVICE
Filed Aug. 27, 1942  2 Sheets-Sheet 1

INVENTOR.
PAUL M. RAINEY
BY James N. Curtin
ATTORNEY

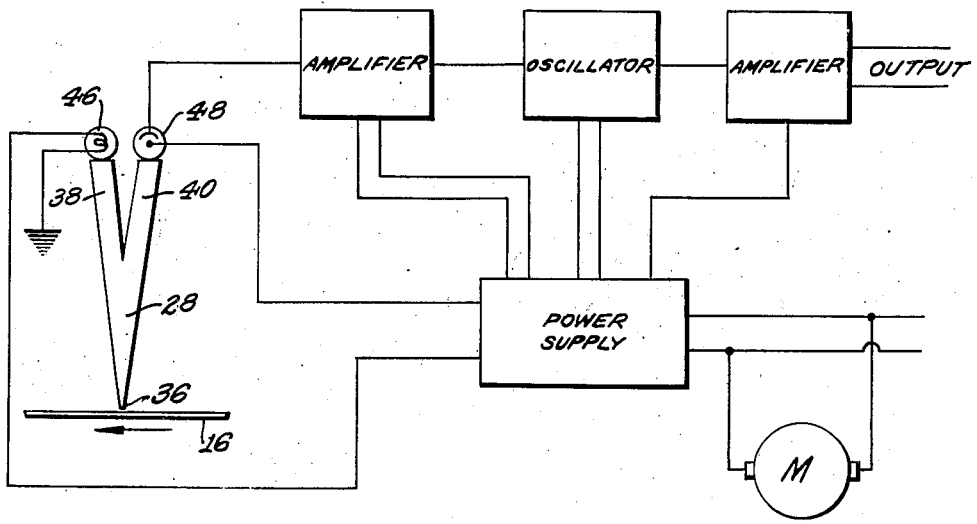
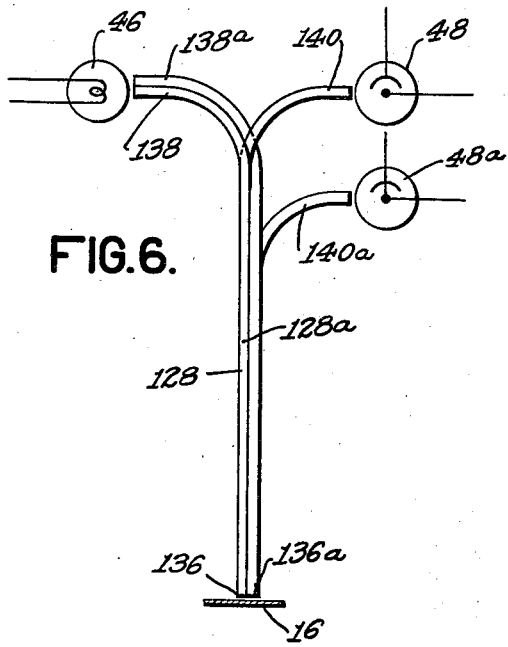
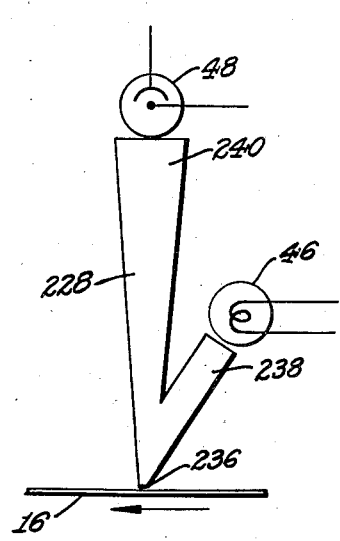

Patented Oct. 29, 1946

2,410,104

UNITED STATES PATENT OFFICE 2,410,104

LIGHT DIRECTING DEVICE

Paul M. Rainey, Martinsville, N. J., assignor to Federal Telephone & Radio Corporation, a corporation of Delaware Application August 27, 1942, Serial No. 456,431

11 Claims. (Cl. 250—41.5)

This invention relates to a light directing device, and more particularly to a novel unitary device for simultaneously conducting and directing both direct and reflected light.

An object of this invention is the provision of a novel light-conducting device which has the property of directing both direct and reflected light along desired internal paths.

Another object of this invention lies in the provision of a V-shaped light-directing device in which the conduction of light therethrough may be controlled by a reflector positioned at the apex of the V.

A further object of this invention is the provision of a novel light-conducting system wherein the passage of light through a V-shaped solid light conductor is controlled by a reflector at the apex of the V.

A more comprehensive object of this invention is to control the energization of a light-sensitive device from a source of light, by positioning the device adjacent the end of one leg of a V-shaped light-conducting member, positioning the light source adjacent the other leg of the V-shaped member, and varying a reflecting surface positioned at the end of the apex of the V.

These and other objects of the invention which will be apparent to those skilled in this art, may be attained by the construction shown by way of example in the attached drawings, wherein:

Fig. 5 is a diagrammatic representation of the electrical circuit connection of a keyer, taken in connection with my novel light-directing device;

Fig. 6 illustrates in side elevation a modified form of light directing device; and Fig. 7 is a front elevation of a still further modified form of light-directing device.

Figure 1:
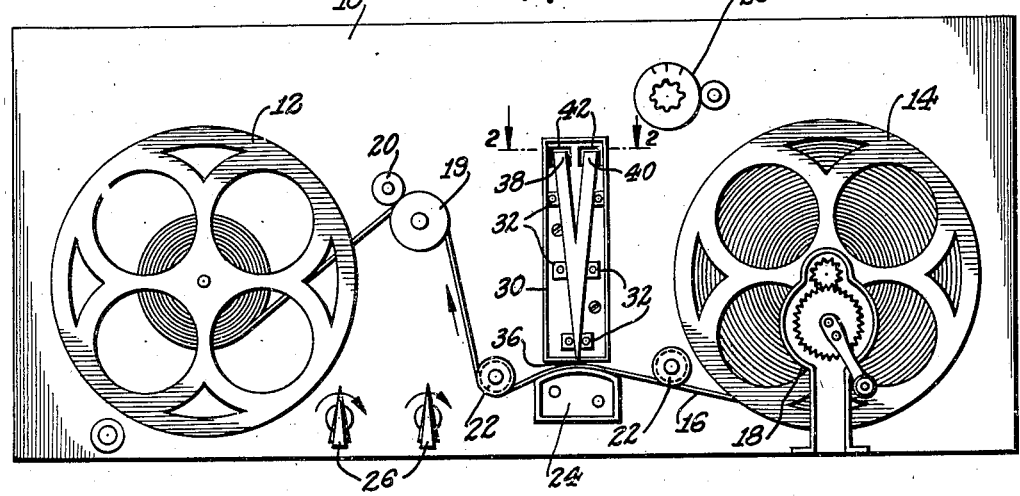
Fig. 1 is a front view of a code practice keyer embodying the light-directing device of the present invention.

In order to illustrate a practical application of the device according to the present invention, in Fig. 1, I have shown the device as applied to the front panel of a code practice keyer, the constructional details of which form no part of the present invention, but are shown merely by way of example.

On front panel 10 of the keyer is a tape reel 12 supplied from reel 14 with a tape 16 having, in the present embodiment, telegraph signals recorded thereon. Tape 16 is adapted to be drawn from reel 14 by a driven friction roller 19 and a cooperating pressure roller 20, and to be wound up on reel 12 by yielding driving means, such as a slipping belt (not shown), connected to the spindle of reel 12. The yielding drive is well known and is used to take care of the constantly increasing diameter of the roll on reel 12 as the paper is wound up. Flanged guide rollers 22 are arranged so as to hold the tape on guiding surface 24. The keyer will also be provided with suitable speed, power and photo-electric cell regulating devices generally indicated at 26.

Telegraph signals are recorded on the tape either in the form of single lines of dots and dashes by ink or perforations, or by dots and dashes in the form of a continuous line as shown in the drawings which represent the so-called undulator type of signal. If perforations are used, an undersurface colored to contrast with the tape should be provided for the member 24.

Figure 3:
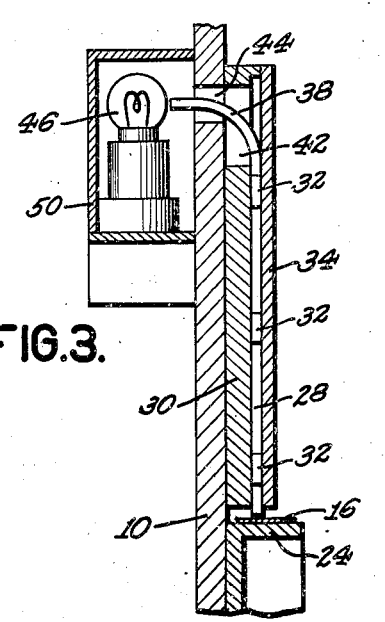
Fig. 3 is a vertical cross-sectional view taken along the line 3—3 of Fig. 2.
Figure 4:
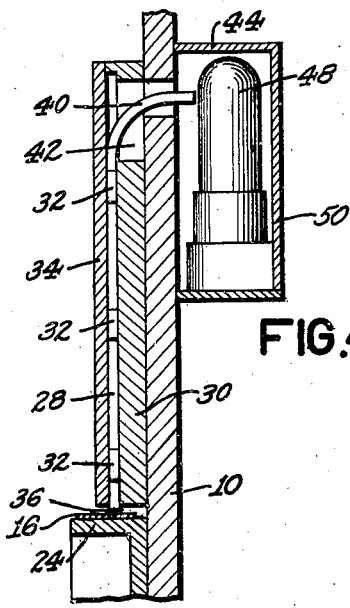
Fig. 4 is a vertical cross-sectional view taken along the line 4—4 of Fig. 2.
Figure 2:
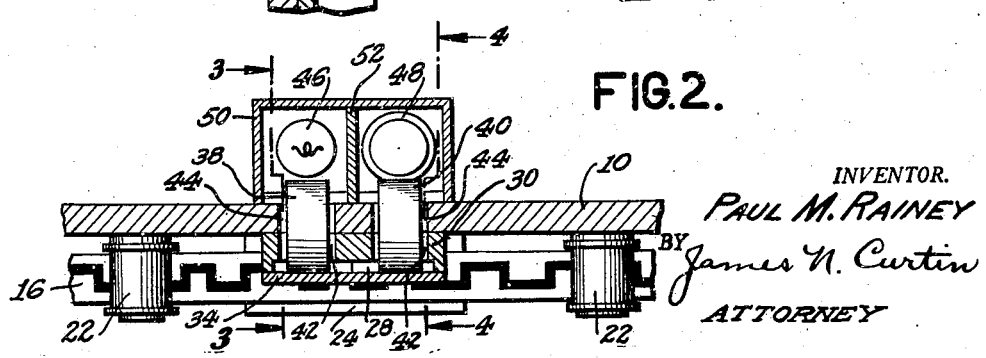
Fig. 2 is a partial cross-sectional view taken along the line 2—2 of Fig. 1, illustrating details of my device, and drawn to a larger scale.

In accordance with the present invention, the intelligence on the tape 16 is "read" and converted into audible signals by an arrangement including a suitable V-shaped device, generally indicated at 28, which will be made of glass or other light-conducting material, such as one of the many well-known artificial resins suitable for this purpose. A preferred material is the plastic "Lucite." Preferably the device 28 is mounted in a box 30, being held in place therein by any suitable means which may take the form of blocks 32, and additionally by a suitable cover 34 (shown removed in Fig. 1). The V-shaped member 28 terminates in a small flattened area which is mounted in juxtaposition to the surface of the tape 16, being spaced very closely thereto. As is more clearly illustrated in Figs. 2, 3, and 4, the legs 38 and 40 of the V-shaped members 28, are bent rearwardly at their outer ends, extending through conjugate openings 42 and 44, respectively, of the housing box 30 and the panel 10. Attached to the rear of the panel at this point by any suitable means, may be provided a holder 50 containing a light source 46 and a light-sensitive device 48, separated by a partition 52. In the example shown the light source 46 is positioned adjacent the end of the leg 38 of the V-shaped member 28, while the light-sensitive device 48 is positioned adjacent the end of the leg 40.

As seen in Fig. 5, the light-sensitive device 48 is connected to an amplifier, an oscillator, and thence through another amplifier to a suitable output, which may be the headphones of students learning the code on the tape 16, all in a manner known to those skilled in this art. The electrical circuits derive their energy from a suitable power supply, and a suitable source of power is also provided for the motor M, driving the puller 19.

In contrast to constructions heretofore used, in which a light was transmitted through a tape containing intelligence thereon to variably control the light on a photo-electric cell, the response of which was then converted into intelligence adapted to be transmitted over the wires, by means of the present invention the reflecting characteristics of the same tape may be used for a similar purpose with the advantage, among several others, of avoiding a garbling of the transmitted intelligence by the collection of dirt or foreign matter in the small aperture through which the light in the old types of apparatus had to be transmitted to the photo-electric cell. In accordance with the present invention, and using the illustrated apparatus by way of example, light from the source 46 will be directed downwardly through the leg 38 to the apex 36 of the V-shaped member 28. If the surface of the tape 16 under the flattened area at the apex of the V-shaped member is, for example, white, light will be reflected from the tape upwardly through the flat area (as seen, for example in Figs. 1 and 5), part of this light returning through the leg 38, but a sufficiently large part returning through the leg 40, to energize the light-sensitive device 48. This energization will, in turn, through the apparatus indicated in Fig. 5, and as is well known in the art, cause either an energization or deenergization of the output, depending upon the way the apparatus is connected. On the other hand, if a portion of the dark signal line on tape 16 is positioned beneath the apex 36, the amount of reflected light will be so reduced that the light-sensitive device 48 will not be energized. It will be understood, therefore, that the signals recorded by light and dark spaces on the tape 16, control cell 48 and whatever output circuits that may be connected therewith.

While I have disclosed my invention as applied to code practice keyers, it is to be distinctly understood that I do not intend to limit the application of my invention to this use alone, but, in its broadest aspect, the invention may be used in any device in which the energization of the light-sensitive device from a light source can be controlled by a variable reflecting surface. The wide scope of the principles of the present invention can be, in part, indicated by the following possible examples. In combination with a light source and a light-sensitive cell, the device could be used as an inspection or flaw detecting device; it would find application in the field of card-sorting or business machines with suitable intelligence on cards passing beneath the device; it could give a repeated continuous message placed on a disc rotating beneath the device; other suitable applications will occur to those skilled in the art.

The light-directing device may take other shapes than that illustrated in Figs. 1 to 5, inclusive. A plurality of light conducting devices may be arranged to scan a plurality of lines, simultaneously, or successively, as required. Fig. 6 shows an arrangement using two light conducting devices disposed to conduct light from a common source 46, to control individual photoelectric cells 48 and 48a by light reflected back from different areas on tape 16. It will be understood that additional light conducting devices could be used similarly for other scanning requirements, for example, twelve or so for scanning business machine cards.

In Fig. 6, the V-shaped device 128 has its legs 138 and 140, as seen in end elevation, extending in opposite directions; the flattened apex 136 being positioned over tape 16, while a similar member 128a is disposed alongside, either in contact with member 128 as shown in the drawings, or spaced a desired distance therefrom, according to requirements.

Legs 138 and 138a are disposed so as to conduct light from light source 46, while legs 140 and 140a of the respective members are offset from each other to conduct light reflected from different areas on tape 16 through the respective light conducting members to photo electric cells 48 and 48a.

The two legs may be of unequal length, as indicated in the form shown in Fig. 7, in which the light source 46 is positioned adjacent the short leg 238, while the reflected light will pass through the longer leg 240 of the light-conducting device 228. Again, however, both legs will meet in a point 236.

Other modifications will suggest themselves to those skilled in the art without departing from the spirit of the invention as described in the following claims.

What is claimed is:

1. In combination, a substantially V-shaped light conducting device, a source of light positioned adjacent the end of one arm of said V-shaped device, a light sensitive element positioned adjacent the end of the other arm of the device, means for controlling the actuation of the light sensitive element by varying the amount of light reflected from the apex of the V through said other arm, said device having its lower apex portion formed with a small flattened scanning area and with opposite angular walls disposed for concentration of the light rays to said area.

2. In combination, a substantially V-shaped light conducting device, a source of light positioned adjacent the end of a first arm of said device, a light sensitive element positioned adjacent the end of a second arm of device, means for controlling the actuation of the light sensitive element by varying the amount of light reflected from the apex of the V through said second arm, said device having its lower apex portion formed with a reduced flattened scanning area and with oppositely positioned angular walls disposed for concentration of rays to said area and wherein the lower wall extension of the second arm is positioned to intercept substantially all light rays from the light source to concentrate on said area and by refraction to direct the major portion of the reflected rays toward the light sensitive means.

3. A light conducting and sensitive apparatus comprising a single unitary substantially V-shaped light conducting element having a small, light-transferring area at the apex thereof, means to direct light into the end of one arm of said element, and a light sensitive cell positioned adjacent the end of the other arm and adapted to receive light projected out of said end.

4. A light conducting and sensitive apparatus as claimed in claim 3 in which at least one of the arms of the V-shaped element is curved.

5. A light conducting and sensitive apparatus comprising a plurality of unitary substantially V-shaped light conducting elements, each having a small, light transferring area at the apex thereof, means to direct light into the end of one arm of each of said elements, a plurality of light sensitive cells, there being one for each of said elements, and means associated with each of said elements to direct light from the end of the other arm thereof into its respective light sensitive cell.

6. A light conducting and sensitive apparatus comprising a plurality of unitary light conducting elements each having two arms joined together and forming a V at the point of juncture with a small light transferring area at the apex thereof, means to direct light into the ends of the other arms of said elements, and a plurality of light sensitive cells positioned so as to receive light projected from the respective ends of the spaced arms of said elements.

7. A light conducting and sensitive apparatus comprising a plurality of unitary substantially V-shaped light conducting elements, each having a small, light transferring area at the apex thereof, so that each is aligned with one of said record paths, means to direct light into the end of one arm of each of said elements, and a plurality of light sensitive cells each positioned so as to receive light projected from the end of the other arm of an individual element, said other arms being curved differently so as to terminate at spaced points to allow for the dimensions of said cells.

8. A device for conducting direct and reflected light comprising a thin V-shaped unit of a light conducting and transparent material with the apex of the V adjacent a surface and the end of one arm of the V cooperating with a direct light source and the end of the other arm cooperating with a light sensitive element, whereby light is conducted through the first-mentioned arm from the light source and any light reflected from the surface through the apex is conducted through the second mentioned arm to the light sensitive element.

9. A device for conducting direct and reflected light according to claim 8, in which the V-shaped unit is composed of a plastic artificial resin.

10. A device for conducting direct and reflected light according to claim 8, in which the V-shaped unit is composed of "Lucite."

11. A device for conducting direct and reflected light according to claim 8, in which the V-shaped unit is composed of glass.

PAUL M. RAINEY.